April 29, 1924.
O. THOMPSON
STEERING WHEEL ATTACHMENT
Filed Sept. 17, 1920
1,492,277
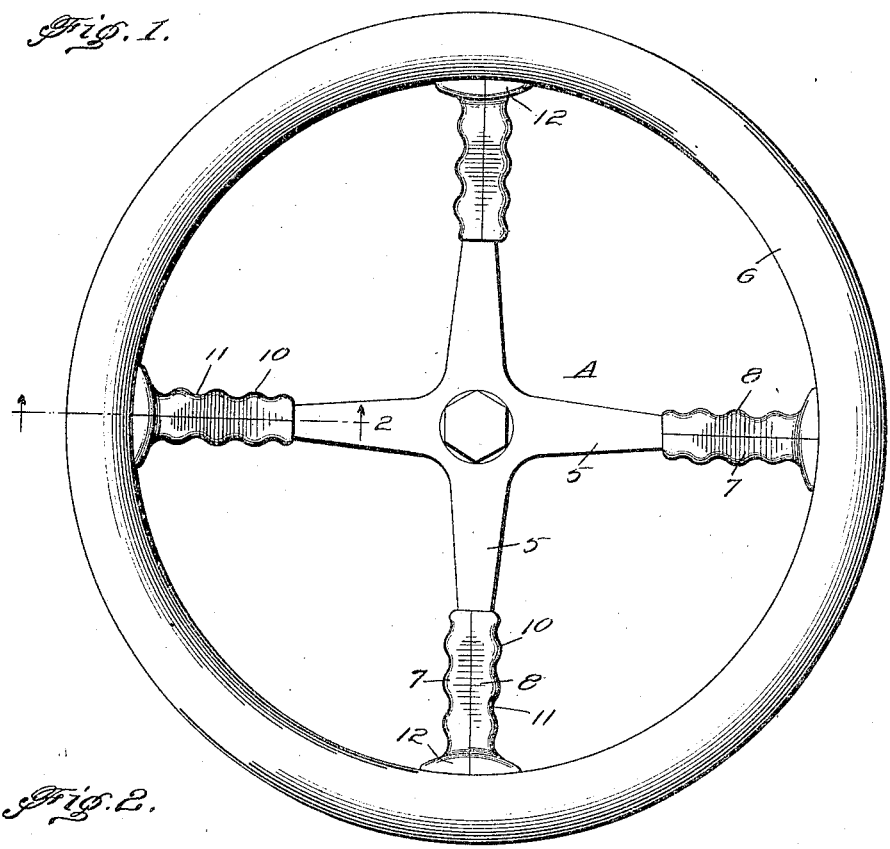
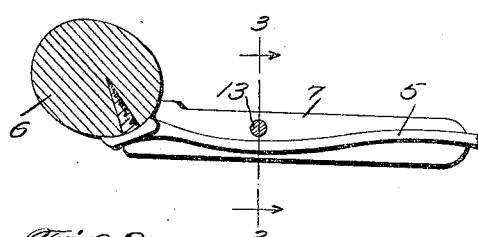
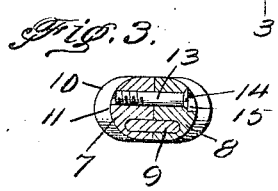
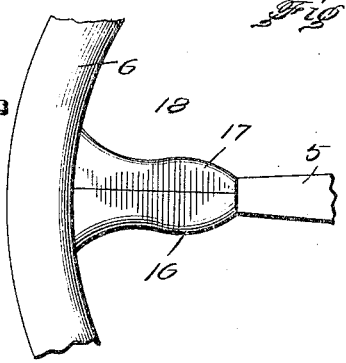
Inventor
Orrin Thompson.
By Geo. P. Kimmel.
Attorney Patented Apr. 29, 1924.

UNITED STATES PATENT OFFICE.

ORRIN THOMPSON, OF NEENAH, WISCONSIN.

STEERING-WHEEL ATTACHMENT.

Application filed September 17, 1920. Serial No. 410,954.

*To all whom it may concern:*

Be it known that I, ORRIN THOMPSON, a citizen of the United States, residing at Neenah, in the county of Winnebago and State of Wisconsin, have invented certain new and useful Improvements in a Steering-Wheel Attachment, of which the following is a specification.

The invention relates to a steering wheel attachment and more particularly to the class of detachable grips for automobile steering wheels.

The primary object of the invention is the provision of a grip of this character, wherein the driver of an automobile can firmly hold the steering wheel, without possibility of the slipping of the hands thereon and at the same time the fingers of the hand will be protected from the edges of the spokes or arms of the steering wheel.

Another object of the invention is the provision of a grip of this character, wherein the same can be readily and easily attached to the spokes or arms of the steering wheel of an automobile, and is adaptable for variable sizes of steering wheels, the grip being of novel form and securely fastened in place.

A further object of the invention is the provision of a grip of this character, which is extremely simple in construction, thoroughly reliable and efficient in its purpose, strong, durable and inexpensive to manufacture.

With these and other objects in view, the invention consists in the features of construction, combination and arrangement of parts, as will be hereinafter more fully described, illustrated in the accompanying drawing and pointed out in the claims hereunto appended.

In the accompanying drawing:

Figure 1 is a plan view of an automobile steering wheel showing the grip constructed in accordance with the invention applied to the spokes or arms of said wheel.

Fig. 2 is a fragmentary enlarged vertical sectional view taken approximately on the line 2—2 of Fig. 1, and looking in the direction of the arrow.

Fig. 3 is a sectional view on the line 3—3 of Fig. 2 looking in the direction of the arrow.

Fig. 4 is a fragmentary plan view showing a slight modification of the grip.

Similar reference characters indicate corresponding parts throughout the several views in the drawing.

Referring to the drawing in detail A designates generally a steering wheel used in connection with the steering mechanism of an automobile and includes the usual spider forming the arms or spokes 5 of the said wheel and the rim 6, the latter being fastened to the ends of the spokes or arms 5 in the usual well known manner.

The grip forming the present invention comprises complementary sections 7 and 8, respectively, which are identical to each other and are formed on their inner sides with flat faces adapted to abut each other when applied to the spoke or arm 5 of the steering wheel in a manner presently described.

In the flat inner faces of the sections 7 and 8 are formed slots or channels 9 which are adapted to coincide with each other on the positioning of the sections 7 and 8 relative to the spoke or arm 5 of the steering wheel A so that the said spoke or arm 5 will be received within the slots or channels 9 with the inner flat faces of said sections in contact with each other. The outer side surfaces of the sections 7 and 8 are corrugated to provide alternate swells 10 and undulations 11 so as to enable the hand of a person to firmly grip the sections when joined with each other without possibility of the slipping of the hand upon the grip.

The outer ends of the sections 7 and 8 are slightly enlarged as at 12 and these enlargements are properly shaped to partially embrace the rim 6 of the steering wheel A when the grip is properly positioned upon the arm or spoke 5 thereof for use.

Passed transversely through the sections 7 and 8 of the grip is a screw or bolt 13, the threads thereof being adapted to bite into one of the sections, while the head 14 of said screw or bolt is counterseated at 15 in the other section and in this manner the said sections 7 and 8 are detachably fastened to each other securely upon the arm or spoke 5 of the steering wheel.

In Fig. 4 of the drawing there is shown a slight modification of the invention, wherein the sections 16 and 17 of the grip are formed with curvilinear outer surfaces 18 in contradistinction to the corrugations embodied in the preferred form of grip as shown in Figs. 1, 2 and 3 of the drawing. The sections 16 and 17 are fastened together upon the spoke or arm 5 of the steering wheel A in an identical manner as sections 7 and 8 hereinbefore described.

The sections of the grip are preferably made from hard rubber, although the same may be made from any other suitable material and it is of course understood that the sizes of the sections of the grips may be varied as well as any number employed accordingly to the number of spokes or arms 5 of the steering wheel.

The advantages of the grip as hereinbefore described are that it gives the driver of an automobile a firmer grip upon the steering wheel and relieves the driver especially of the fear of injury to his hand when it comes in contact with the edges of the spokes or arms of the steering wheel as often happens when driving upon rough stony roads.

It is of course understood, that the grip can be made from flexible rubber, with or without fabric or other stiffening substance and when made of flexible rubber can be constructed in one piece, moulded so that when in position for use it will exactly fit and adapt itself to the spoke of the steering wheel and the contiguous and adjoining portions of the wheel. In constructing the device of flexible rubber and in one piece, there will be provided a slit along the lower or under side of the device where the same comes in contact with the spoke of the steering wheel so that the device can be readily opened by pulling apart the edges along the said slit thereby enabling said device to be slipped into position on the wheel and the elasticity of the device will close the same and securely hold it in proper position upon said wheel.

What is claimed is:

1. The combination with a shell including a rim and spokes flat transversely, of a grip device in coacting sections engaging face to face and having recesses in their confronting faces to bear over one of the spokes and with their outer ends laterally extended to bear against the rim adjacent to the spokes to provide protection to the fingers of the operator, said recesses being near one side of the section whereby the major portions thereof are at one side of the spoke, and a fastening element extending through the thicker or major portions of the sections.

2. A grip device comprising coacting sections engaging face to face and having recesses near one side face in their confronting faces to bear over the spoke of a wheel next to the rim thereof and with lateral projections to bear against the rim adjacent to the spoke, and fastening devices operating through the thicker portions of the sections.

In testimony whereof, I affix my signature hereto.

ORRIN THOMPSON.